Nov. 19, 1963    M. P. LEWIS, JR., ETAL    3,111,038
CAGING MECHANISM FOR GYROSCOPE
Filed Jan. 3, 1961
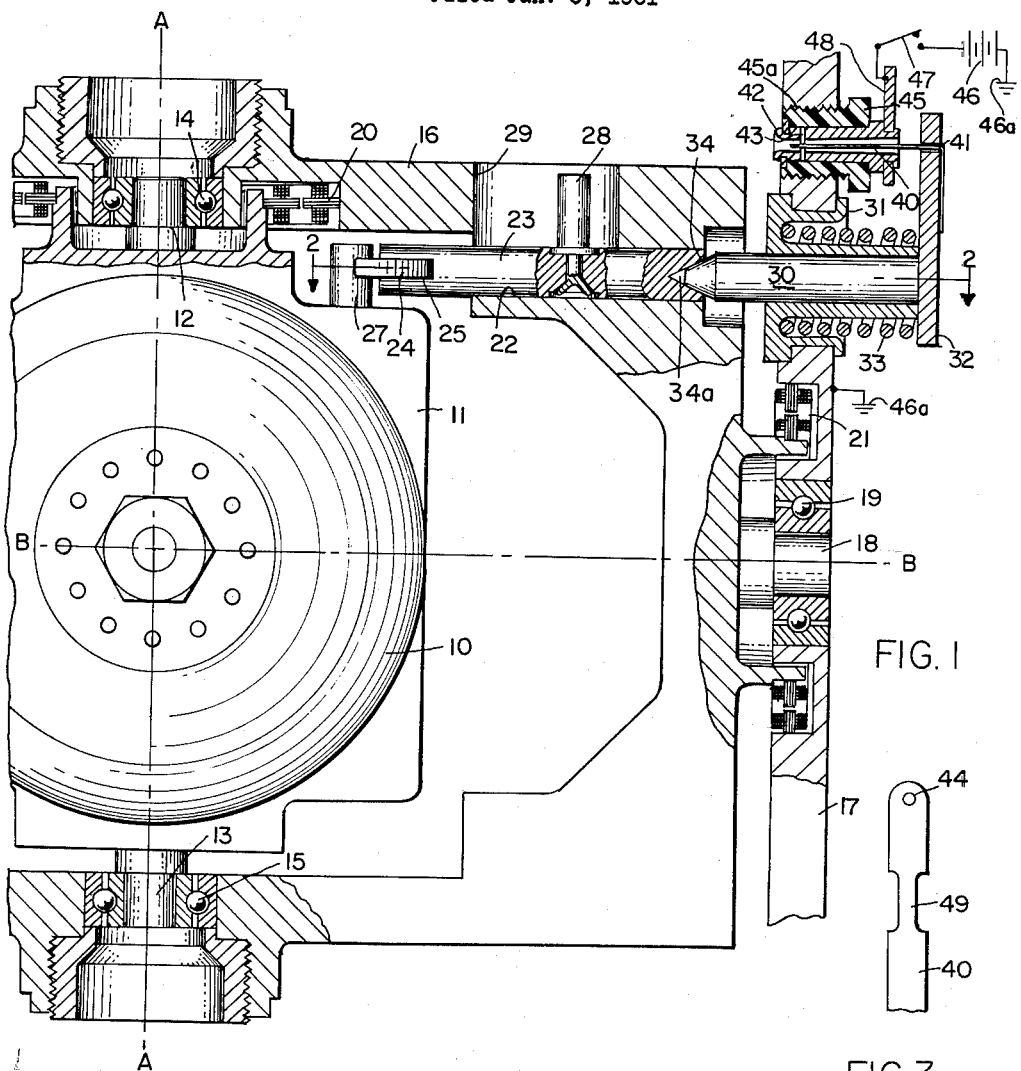
FIG. 1
FIG. 3
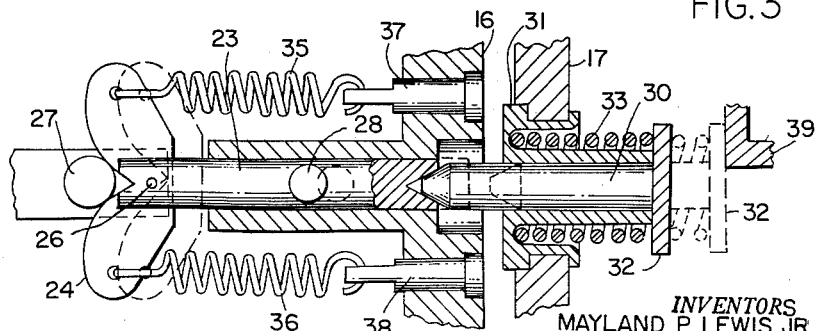
FIG. 2
INVENTORS
MAYLAND P. LEWIS JR.
HARRY G. SWANSON
BY Richard E. Hosley
THEIR ATTORNEY

United States Patent Office

3,111,038
Patented Nov. 19, 1963

3,111,038
CAGING MECHANISM FOR GYROSCOPE
Mayland P. Lewis, Jr., Nahant, and Harry G. Swanson, Tewksbury, Mass., assignors to General Electric Company, a corporation of New York
Filed Jan. 3, 1961, Ser. No. 80,417
2 Claims. (Cl. 74—5.1)

The present invention relates to gyroscopes and more particularly to a caging mechanism for locking and unlocking the gyroscope relative to its support.

Gyroscopes are commonly used to provide inertial guidance of aircraft and other moving vehicles. Such gyroscopes are usually provided with a caging mechanism to lock the gyroscope to its support while the gyroscope is being brought up to speed and occasionally during periods of high acceleration, as during take-off of the aircraft on which it is used. For such applications it is common to provide apparatus for uncaging the gyroscope by remote control; and heretofore this has been accomplished by the use of solenoids and other forms of electromotive apparatus for operating the caging mechanism in response to an electric control signal received from a radio control link or other suitable control signal transmission system. Such electromotive apparatus for operating the gyro caging mechanism is relatively heavy, costly, and is sometimes adversely affected by accelerations which may cause a malfunctioning of the equipment.

Accordingly, it is an object of this invention to provide an improved caging mechanism for a gyroscope that is exceedingly reliable and foolproof in operation, especially when subject to high acceleration forces.

Another object of the invention is to provide a caging release mechanism for a gyroscope that is simple, inexpensive, and which lends itself conveniently to electrical control.

Further objects and advantages of the invention will become apparent as the following description proceeds.

In accordance with the invention, there is provided a caging mechanism for a gyroscope that functions to lock the gyroscope to its support. The caging mechanism moves between caged and uncaged positions and is normally biased to the uncaged position by spring or other suitable biasing means. The caging mechanism is normally held against the force of the biasing means in the caged position by a fusible member under tension and released by an electrical signal which melts the fusible member. In the illustrated embodiment of the invention, the fusible caging release is melted by passing an electric current through it in response to closure of a switch connecting it to a suitable source of electric power.

For a better understanding of the invention, reference should be made to the following detailed description taken in connection with the accompanying drawings in which:

FIG. 1 is a fragmentary view, partly in section, of gyroscope apparatus having a caging mechanism and release therefor constructed in accordance with the invention;

FIG. 2 is a partial view of the caging mechanism taken along the section line 2—2 of FIG. 1; and FIG. 3 shows a constructional detail of a part of the caging release mechanism.

Referring now to FIG. 1 of the drawing, the caging mechanism of the present invention is shown as embodied in gyroscope apparatus of a type suitable for use on aircraft for controlling guidance equipment such as an automatic pilot. The apparatus comprises a universally mounted gyroscope providing a reference for measuring angular movement of the aircraft about the gyroscope axes. The gyroscope has a rotor construction which, as illustrated, is similar to that disclosed and claimed in United States Patent No. 2,731,836, Wendt, which is assigned to the same assignee as the present invention and to which reference may be made for constructional details. As shown, the gyroscope comprises a rotor having two collinear spaced apart rotor halves of like dimensions and configurations, one of which is shown in the drawing and identified by the numeral 10. The rotor halves are spun rapidly by means of an electric motor (not shown) supported on a rotor frame 11 which supports the rotor bearings so that the rotor is spun about a spin axis normally perpendicular to the plane of the drawing. The rotor frame is supported on trunnions 12 and 13 rotatably mounted on ball bearings 14 and 15 carried in a gimbal 16 so that the frame is free to rotate about the minor axis of the gyro identified by the lines AA. The gimbal 16 is, in turn, rotatably mounted on a fixed support 17 by means of trunnions, one of which is shown at 18 carried by ball bearings 19 mounted on the support. This permits gimbal 16 to rotate about the major axis of the gyroscope BB perpendicular to the minor axis AA, which is, in turn, perpendicular to the spin axis of the gyroscope. This type of universal gyroscope mounting is well known and is referred to as a Cardan suspension. With this mounting the spinning gyroscope tends to maintain the orientation of its spin axis in space in a known manner so that angular movement of the aircraft, including the support 17 about axes AA and BB, may be measured, respectively, by the angular movement of frame 11 relative to gimbal 16 and movement of gimbal 16 relative to support 17. These angular motions may be measured, as illustrated, by suitable electrical pick-off devices 20 and 21, the outputs of which may be used to control automatic pilot equipment (not shown) used to steer the aircraft. The gyroscope equipment thus far described is conventional and well known so that further description is deemed unnecessary.

Gyroscope apparatus of the type described above is customarily provided with caging mechanism which functions to lock gyroscope rotor frame 11 and gimbal 16 to the fixed support 17 and at the same time center the gyroscope with respect to angular motion about the minor and major gyro axes AA and BB. The present invention is concerned specifically with the construction of such a a caging mechanism, including an arrangement by which the caging mechanism may be released in response to an electrical signal.

Referring now to the details of the caging mechanism, the gimbal 16 is provided with an aperture 22 carrying a sliding pin 23 which, in the position illustrated in FIG. 1, functions to lock the rotor frame 11 against movement relative to the gimbal 16 around the minor gyro axis AA. This locking action is accomplished by means of a heart cam 24 pinned in a slot 25 on the inner end of the sliding pin 23 by means of a fastening pin 26. In the caged position the center part of the heart cam 24 engages a pin 27 projecting outwardly from the rotor frame 11, the arrangement being such that when the pin 27 engages the center of the cam the gyro rotor frame 11 is centered and locked wtih respect to gimbal 16. For the purpose of guiding the movement of the sliding pin 23, there is provided a guide pin 28 which moves in an elongated slot 29 provided in gimbal 16.

The gimbal 16 is centered and locked with respect to support 17 by means of a second sliding pin 30 carried in a bushing 31 extending through support 17 so that the sliding pin 30 is aligned with sliding pin 23 described above. Rigidly connected to the outer end of pin 30 to form a caging member is an upstanding flange 32 which, in the position shown, abuts the outer end of the bushing 31 and acts as a stop for a compression spring 33 extending between the flange 32 and bushing 31. The inner end of the sliding pin 30 has a tapered surface 34 which is received in a hole 34a in the outer end of pin 23 when the two pins 30 and 23 are in the inner caged position shown in the drawing. In this position the engagement of the inner end of pin 30 with the outer end of pin 23 acts to lock the gimbal 16 in a centered position relative to the support 17.

For the purpose of moving sliding pin 23 outwardly to the uncaged position in which the pin 27 and the gyro rotor frame 11 are free to rotate about the minor gyro axis AA, there are provided two tension springs 35 and 36 (FIG. 2) extending between pins 37 and 38 fastened to gimbal 16 and the outer portions of the heart cam 24. These springs tend to retract the sliding pin 23 to an uncaged position in which the guide pin 28 arrests further motion of the pin by engagement with the outer end of the elongated slot 29 in the gimbal. Similarly, the compression spring 33 tends to move the guide pin 30 to the outer uncaged position in which the inner end of the pin becomes disengaged from the end of pin 23 and also clears the gimbal 16 so that the gimbal is free to rotate about the major gyro axis BB. This movement of the pin 30 beyond the uncaged position is arrested by means of a suitable stop indicated schematically in FIG. 2 as a stop member 39. It will be noted that the positions of the sliding pin 23, heart cam 24, sliding pin 30, and flange 32 when these parts are moved to the uncaged position are indicated by the dotted lines in FIG. 2 of the drawing.

For the purpose of holding the caging mechanism in the caged position against the biasing force exerted by springs 33, 35, and 36, there is provided a fusible locking device which will now be described. The principal element of the fusible locking device is a strip of electrically conducting material 40, one end of which is soldered or otherwise suitably secured to the flange 32. The strip 40 extends through a hole 41 in the flange, and the other end projects into a sleeve 42 of electrically conducting material and is pinned in the sleeve by means of an electrically conducting pin 43 in the sleeve 42 which extends through a hole 44 in the end of strip 40. The sleeve 42 is carried in a bushing 45 of electrically insulating material which, in turn, threadedly engages an opening 45a in support 17. With this arrangement the strip of conducting material 40 is under tension and acts to hold the caging mechanism in the inner caged position illustrated in the drawing. The caging mechanism is released by melting the strip 40 so that the pins 30 and 23 are free to move outwardly to the uncaged outer position under the influence of the biasing springs 33, 35, and 36. Preferably, the melting of the strip 40 is accomplished directly by passing an electric current through the strip although it could be accomplished by an auxiliary heater if desired. To accomplish this, there is shown a suitable electric power supply, such as a battery 46, arranged to be connected to the inner end of strip 40 through a circuit which includes a switch 47, an electric connector 48 secured to the outer end of conducting sleeve 42 in any suitable manner, the sleeve 42, and the pin 43. In order to calibrate the strip 40 so that it will melt and release when a predetermined current is passed therethrough, there is provided a reduced section 49, the dimensions of which are selected in relation to the electrical resistance of section 49 and the current flow from battery 46 to insure rapid melting of the section 49 when the switch 47 is closed to complete the circuit to the battery. The tension strip 40 is formed of electrically conducting material having the requisite tensile strength in relation to the forces applied by the biasing springs 33, 35, and 36. Tests have indicated that an electrical conducting material sold under the trade name "Elgiloy" is satisfactory for this purpose. This material is a cobalt base alloy comprising 40 percent cobalt, 20 percent chromium, 15 percent nickel, 15 percent iron, 7 percent molybdenum, 2 percent manganese, .15 percent carbon, and .05 percent beryllium. This material has a very high tensile strength of 386,000 p.s.i. and is also nonmagnetic and corrosion resistant.

It is believed that the operation of the improved caging apparatus of the present invention will now be clear. When the parts are in the position shown in FIG. 1 of the drawing, the caging pins 23 and 30 are held in the inner caged position by a tension force exerted on flange 32 by strip 40. In this position the gyro rotor frame 11 is locked with respect to rotation about the minor axis AA, and the gimbal 16 is locked with respect to rotation about the major axis BB. In this position the electrical pick-off devices 20 and 21 are usually in a null position with a zero output so that the caged position of the gyro is a convenient reference point for measuring subsequent angular movements of the support 17 about the gyro axes when the gyro is free. In the caged position the gyro motor may be energized and the rotor brought up to speed while the caging mechanism prevents any movement of the gyro from the center position due to reaction torques. Furthermore, any acceleration forces to which the gyroscopic equipment may be subject, as during take-off of an aircraft on which the equipment may be used, will not produce any undesired output signals. When it is desired to release the caging mechanism to free the gyro to perform its control functions, the switch 47 is closed, which completes an electrical circuit from battery 46 through the strip 40, the return circuit to the battery being through the conducting frame 17 and the ground connections 46a. This operation of the switch 47 may, for example, be accomplished by remote control equipment involving a radio transmission link with a remote control station. The flow of current through the strip 40 and particularly the reduced section 49 melts the strip, thereby freeing the spring 33 to move pin 30 to the extreme right position against stop 39 shown in dotted lines in FIG. 2 of the drawing. This, in turn, frees springs 35 and 36 to move pin 23 to the right until guide pin 28 engages the end of slot 29. This outer movement of the pin 30 frees the gimbal 16 with respect to support 17, and the outer movement of the pin 23 frees the pin 27 on the rotor frame 11 with respect to the heart cam 24 so that the gyro rotor frame and the gyroscope are free to rotate with respect to the gimbal 16. Tests have shown that this mechanism is exceedingly reliable, which feature is particularly important where the gyroscope apparatus is used on unmanned aircraft such as drones. Furthermore, it will be apparent that the mechanism involved is simple, inexpensive, and easy to install and calibrate in production.

While there have been described what are at present considered to be the preferred embodiments of the invention, it will be apparent to those skilled in the art that various changes and modifications may be made therein without departing from the spirit or scope of the invention.

What we claim as new and desire to secure by Letters Patent of the United States is:

1. A caging mechanism for a gyroscope movably mounted on a fixed support by a gimbal comprising a first pin slidably mounted on the gimbal to engage and lock the gyroscope relative to the gimbal, a second pin slidably mounted on the support to engage and lock the gimbal relative to the support, said pins being axially aligned so that the second pin engages and positions the first pin in the caged position, spring means urging both pins to the uncaged position, a fusible member connected to the second pin and normally holding both pins in the caged position, and caging release means for melting said fusible member permitting the pins to move to the uncaged position under the influence of the spring means.

2. A caging mechanism for a gyroscope as set forth in claim 1 wherein the fusible member is formed of electrically conducting material and the caging release means comprises an electric circuit for conducting current through the fusible member.

References Cited in the file of this patent

UNITED STATES PATENTS

| | | |
|---|---|---|
| 1,421,854 | Sperry | July 4, 1922 |
| 2,457,499 | Santole | Dec. 28, 1948 |
| 2,625,045 | Brubaker et al. | Jan. 13, 1953 |
| 2,654,254 | Wendt | Oct. 6, 1953 |
| 2,866,342 | Moorhead | Dec. 30, 1958 |
| 2,872,821 | Derossi | Feb. 10, 1959 |
| 3,012,439 | Ransom et al. | Dec. 12, 1961 |